United States Patent
Eagleson et al.

(10) Patent No.: US 9,145,262 B2
(45) Date of Patent: Sep. 29, 2015

(54) CONVEYOR BELT TRACKING MECHANISM AND CONVEYOR EMPLOYING THE SAME

(71) Applicant: Mettler-Toledo, LLC, Columbus, OH (US)

(72) Inventors: Craig L. Eagleson, Ithaca, NY (US); Eric A. Inglin, Ithaca, NY (US)

(73) Assignee: Mettler-Toledo, LLC, Columbus, OH (US)

( * ) Notice: Subject to any disclaimer, the term of this patent is extended or adjusted under 35 U.S.C. 154(b) by 0 days.

(21) Appl. No.: 14/284,178

(22) Filed: May 21, 2014

(65) Prior Publication Data

US 2015/0232282 A1    Aug. 20, 2015

Related U.S. Application Data

(60) Provisional application No. 61/942,461, filed on Feb. 20, 2014.

(51) Int. Cl.
  *B65G 39/16*    (2006.01)

(52) U.S. Cl.
  CPC ...................... *B65G 39/16* (2013.01)

(58) Field of Classification Search
  CPC ....................................................... B65G 39/16
  See application file for complete search history.

(56) References Cited

U.S. PATENT DOCUMENTS

| | | | |
|---|---|---|---|
| 3,435,693 A * | 4/1969 | Wright et al. | 474/106 |
| 4,061,222 A * | 12/1977 | Rushing | 198/807 |
| 4,174,171 A * | 11/1979 | Hamaker et al. | 399/165 |
| 4,572,417 A * | 2/1986 | Joseph et al. | 226/20 |
| 4,641,770 A * | 2/1987 | Hediger | 226/23 |
| 5,609,241 A | 3/1997 | Shaw | |
| 5,659,851 A * | 8/1997 | Moe et al. | 399/165 |
| 5,717,984 A * | 2/1998 | Wong | 399/165 |
| 6,116,410 A | 9/2000 | Malmberg | |
| 6,131,726 A | 10/2000 | Hovsto et al. | |
| 6,267,228 B1 | 7/2001 | Cadwell et al. | |
| 6,405,854 B1 * | 6/2002 | Cumberlege | 198/806 |
| 6,431,348 B2 * | 8/2002 | Malmberg | 198/806 |
| 6,776,280 B2 | 8/2004 | Hovstoet et al. | |
| 7,267,255 B1 * | 9/2007 | Young et al. | 226/15 |
| 7,614,493 B2 * | 11/2009 | Dowling et al. | 198/806 |
| 7,669,709 B2 * | 3/2010 | Hovsto et al. | 198/806 |
| 8,360,233 B2 * | 1/2013 | Eriksson | 198/806 |
| 8,556,068 B2 * | 10/2013 | DeVries | 198/807 |
| 2001/0013462 A1 * | 8/2001 | Malmberg | 198/836.3 |
| 2001/0023815 A1 | 9/2001 | Mott | |
| 2013/0284565 A1 * | 10/2013 | Kuiper et al. | 198/617 |

FOREIGN PATENT DOCUMENTS

| | | | | |
|---|---|---|---|---|
| CN | 201052912 Y | 4/2008 | | |
| CN | 201580764 U | 9/2010 | | |
| GB | 2182905 A | * | 5/1987 | B65G 39/16 |
| WO | 2012/034420 A1 | 3/2012 | | |

* cited by examiner

*Primary Examiner* — Gene Crawford
*Assistant Examiner* — Thomas Randazzo
(74) *Attorney, Agent, or Firm* — Standley Law Group LLP

(57) ABSTRACT

Exemplary embodiments described herein are directed to conveyor belt tracking mechanisms with a single adjusting element and to conveyors having conveyor belts whose tracking may be adjusted in both directions using such conveyor belt tracking mechanisms. One exemplary conveyor belt tracking mechanism embodiment employs a pulley support yoke coupled to a specialized angular linkage having a linkage flexure pivot that translates linear motion into angular motion.

20 Claims, 9 Drawing Sheets

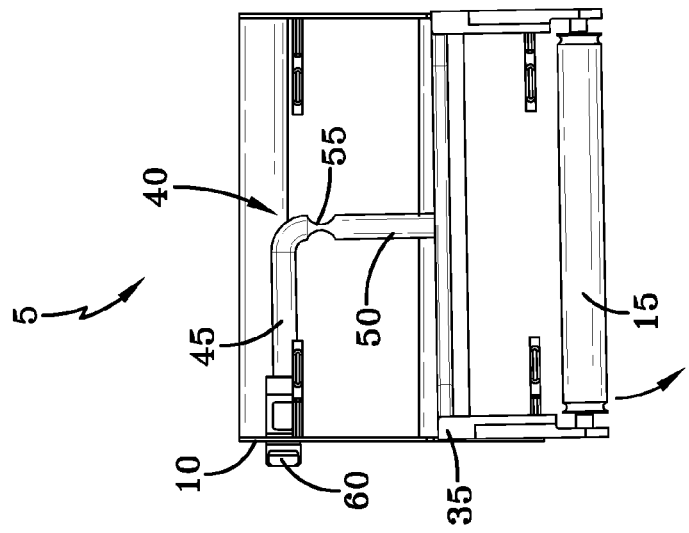
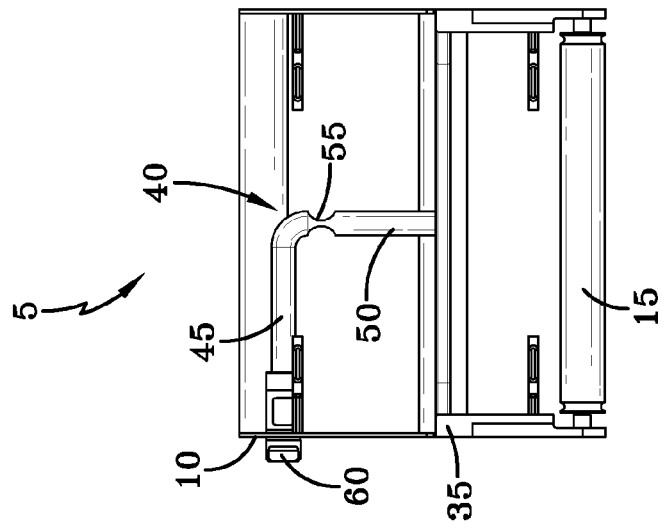
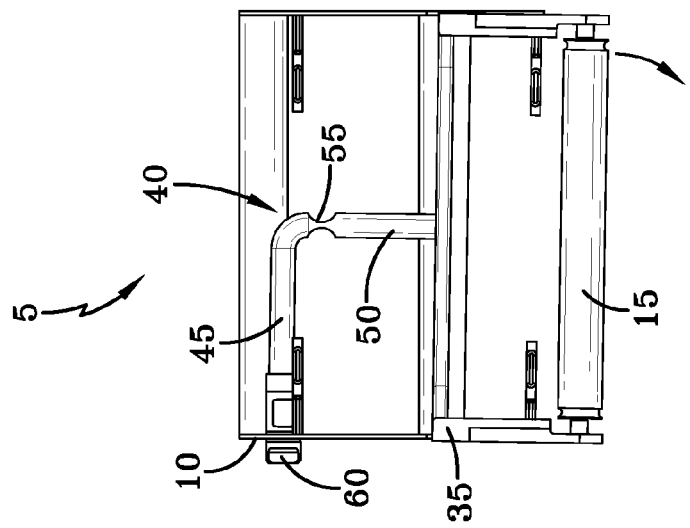

CONVEYOR BELT TRACKING MECHANISM AND CONVEYOR EMPLOYING THE SAME

CROSS-REFERENCE TO RELATED APPLICATIONS

This application claims the benefit of U.S. Provisional Application No. 61/942,461, filed Feb. 20, 2014, which is hereby incorporated by reference in its entirety.

TECHNICAL FIELD

Embodiments of the invention are directed to conveyor belt tracking mechanisms with a single adjusting element and to conveyors having conveyor belts whose tracking may be adjusted using such conveyor belt tracking mechanisms.

BACKGROUND

Conveyors are well known devices and come in many forms. Generally speaking, most common conveyors typically feature a conveyor body (frame), spaced apart pulleys, a conveyor belt that is stretched between the pulleys, and a conveyor belt tracking mechanism for adjusting both belt tension and the tracking of the moving conveyor belt. The tracking of a conveyor belt on the conveyor pulleys may depend largely on how squarely the belt is cut by the belt manufacturer. However, without a tracking mechanism, a conveyor belt will typically track to the left or to the right over time, and will frequently rub against the conveyor body. This rubbing often leads to conveyor noise, conveyor belt wear, and eventually to conveyor belt failure through mechanical abrasion.

Like conveyors themselves, conveyor belt tracking mechanisms are well known in the conveyor industry. While known conveyor belt tracking mechanisms may vary somewhat in design, such mechanisms typically include a tensioning screw located along each side of the conveyor body in the area of an adjustable conveyor drive pulley (see FIG. 1). The drive pulley commonly features at least a slightly trapezoidal or circular crown (profile) to facilitate movement of the conveyor belt along the pulley surface when appropriate.

As best illustrated in FIGS. 2A-2B, turning one of the adjusting screws shown in FIG. 1 results in a canting of the drive pulley with respect to the conveyor frame and the other pulley, and will cause greater tension along one side of the belt. As can be understood from observation of FIGS. 2A-2B, the conveyor belt will move away from the end of the pulley that is placing the belt under the most tension (i.e., the belt moves downward with respect to the drawing page in FIG. 2A and upward with respect to the drawing page in FIG. 2B). Hence, a manipulation of the adjusting screws may be employed to move the belt from one side of the conveyor to the other.

One negative effect of conveyor belt tracking mechanisms that utilize two screws for belt tracking adjustment is that both screws must normally be manipulated to achieve acceptable tracking of the conveyor belt. This operation can be tedious particular but not only because the tracking sensitivity of the belt is often quite high, meaning that even a minute rotation (e.g., ⅛ of one turn, depending on the tread pitch of the screw) of one of the tracking adjustment screws in one direction or the other will lead to the belt shifting away from the centerline of the conveyor.

Also, an unintended consequence of a conveyor belt tracking mechanism like that depicted in FIGS. 1 and 2A-2B is that the use of two adjusting screws during a belt tracking adjustment process often leads to an over-tensioning of the conveyor belt, which may result in an overloading of the pulley bearings and early bearing failure. Such over-tensioning of the conveyor belt is most often associated with conveyor belts comprised of a polyester carcass because the polyester material significantly restricts stretching of the conveyor belt. The benefit of such a conveyor belt is that through increased belt tension, it is possible to prevent the belt from slipping on the drive pulley when a heavy load is carried by the conveyor.

Not all conveyors employ polyester carcass conveyor belts. For example, polyester carcass conveyor belts are prohibited from use in food applications because an accumulation of food debris may remain in the carcass even after a sanitary wash down, and such an accumulation of food debris may lead to food contamination. Consequently, conveyor manufacturers often utilize closed cell stretch belts in food applications. Conveyor belts of such a construction have the benefit of not absorbing food debris or fluids and can be sanitized on the conveyor or removed from the conveyor and sanitized in a separate and typically chlorine-based cleaning solution before being placed back onto the also cleaned conveyor body.

In the case of a conveyor having a closed cell stretch conveyor belt, belt tension on the pulleys is defined by a stretch factor specified by the belt manufacturer. Because of the more stretchable nature of such a conveyor belt, placing additional tension on the belt will not produce a significant tracking improvement because the stretched belt will only add marginal additional tension to the conveyor drive system. Furthermore stretching the conveyor belt to achieve better belt tracking may lead to an increase in the physical length of the conveyor, which may ultimately result in an interference with other conveyors adjacent to the conveyor whose belt has been stretched. Therefore, rather than achieving increased belt traction through belt stretching, increased belt traction on the drive pulley of such a conveyor is more often produced by placing easy to clean grooves over the length of the pulley surface. The grooves act to provide additional traction between the belt and the pulley while still permitting the pulley to be cleaned in a sanitary manner.

In sanitary applications, such as food applications, the use of conveyor belt tracking mechanism adjusting screws with exposed threads is also unacceptable because of the difficulty associated with cleaning out the threads of the screws during conveyor sanitation. Consequently, there is an interest in altogether eliminating conveyor belt tracking mechanism adjusting screws.

An alternative conveyor design having this goal in mind is schematically represented in FIG. 3. In the conveyor of FIG. 3 both the drive and idler pulleys of the conveyor are crowned, with the intent being to keep the conveyor belt from tracking away from the center of the pulleys and conveyor body. A downside to this design, however, is that the conveyor belt will tend to be pushed by both pulleys towards the center of the conveyor, which ultimately leads to a crease in the belt and to early belt failure. Furthermore, the variability of the belt splicing process employed during conveyor belt manufacturing frequently results in an improper tracking of the belt on the conveyor if no other tracking adjustment is provided.

It can be understood from the foregoing background description that there is a need for a conveyor belt tracking mechanism that overcomes the deficiencies of known tracking mechanisms, and for a conveyor employing such a conveyor belt tracking mechanism. Therefore, an objective of the exemplary conveyor belt tracking mechanism embodiments described herein is to overcome the deficiencies of known tracking mechanisms.

SUMMARY

Exemplary embodiments of the invention include conveyor belt tracking mechanisms that eliminate the need to employ separate belt tracking actuators (e.g., screws). Exemplary embodiments of the invention also include conveyors that include such conveyor belt tracking mechanisms.

In contrast to known conveyor belt tracking mechanisms that utilize separate belt tracking screws for providing associated left and right tracking adjustment of a conveyor belt, conveyor belt tracking mechanism embodiments according to the invention provide for bi-directional belt tracking adjustment via a single adjustment element (e.g., screw).

Exemplary conveyor belt tracking mechanisms according to the invention make use of a conveyor pulley support yoke that is pivotable about a designated pivot point. Rotation of the yoke about the pivot point in one direction or the other will cause a canting of the supported pulley with respect to the conveyor body and the opposite pulley, thereby leading to a corresponding leftward or rightward movement of the conveyor belt along the canted pulley.

A specialized angular linkage having a flexure pivot between its linkage legs is connected between the pulley support yoke and the single adjustment element. The flexure pivot—which may be machined into or otherwise created within the linkage—produces a weak point that allows for an angular change to occur between the linkage legs. As such, a linear displacement of the single adjustment element coupled to one of the linkage legs will pull or push the other linkage leg and rotate the yoke and the supported pulley in a manner that causes a tracking adjustment of the conveyor belt. A tensioning spring may be used to apply constant pressure to the linkage and to permit the single adjustment element to be displaced without physically moving away from the conveyor body.

There are a number of benefits associated with a conveyor belt tracking mechanism embodiment of the invention, as well as with a conveyor employing such a conveyor belt tracking mechanism. Such benefits include, but are not necessarily limited to: placement of the adjustment mechanism away from the pulley area, which allows for a simpler pulley construction and an easier removal of the pulley for wash down purposes; easy access to the single adjustment element when a belt tracking adjustment is needed; reduced complexity of the belt tracking adjustment process through use of a single adjustment element; the ability to easily encapsulate the single adjustment element if desired for purposes of a sanitary conveyor construction; the simplistic adjustment of tracking mechanism sensitivity by manipulating the ratio of adjusting element movement (e.g., adjusting screw pitch) to linkage movement, in combination with the ratio of the linkage length to the extension of the yoke from the yoke pivot point.

An exemplary embodiment of a conveyor belt tracking mechanism according to the invention may include, for example, a pulley support yoke adapted for at least limited rotational movement within a frame of the conveyor and to support and retain a conveyor pulley; an angular linkage having a first leg and a second leg between which resides a flexure pivot that creates a weak point within the linkage and permits an angular change to occur between the first and second linkage legs; a free end of the second linkage leg that is coupled to the pulley support yoke; and a single adjustment element that is coupled to a free end of the first linkage leg at a point away from a pulley support location of the pulley support yoke, such that adjustment of the single adjustment element will produce, through the angular linkage, a pivoting in a selected direction of the pulley support yoke and any pulley supported thereby.

Such conveyor belt tracking mechanism embodiments may further include a pulley support yoke in the form of a substantially U-shaped open frame having an elongated linkage connecting leg from which two pulley support legs transversely extend. Such conveyor belt tracking mechanism embodiments may further include a pulley support yoke that is adapted to support an idler pulley or a drive pulley of the conveyor. Such conveyor belt tracking mechanism embodiments may further include an angular linkage in the form of a bent but continuous tubular member, in which case the flexure pivot may be formed by one or more voids in the tubular member wall material. Alternatively, such conveyor belt tracking mechanism embodiments may further include an angular linkage in the form of a solid member, in which case the flexure pivot may be formed by an area of thinned linkage material. Such conveyor belt tracking mechanism embodiments may further include a single adjustment element in the form of an adjusting screw that is coupled to a frame of the conveyor, in which case the sensitivity of the belt tracking mechanism may be adjustable by altering the thread pitch of the adjusting screw. A tension spring may also be used in combination with such an adjusting screw. In yet other conveyor belt tracking mechanism embodiments, the sensitivity of the belt tracking mechanism may be adjustable by altering the ratio of the length of the second linkage leg to the offset of the pulley support yoke from its connecting point with the second linkage leg.

Similarly, an exemplary embodiment of a conveyor according to the invention may include, for example, a conveyor frame; a drive pulley and an idler pulley; an endless loop conveyor belt that travels over the pulleys; a pulley support yoke mounted with at least limited rotational movement within a frame of the conveyor and supporting and rotationally retaining one of the conveyor pulleys; an angular linkage having a first leg and a second leg between which resides a flexure pivot that creates a weak point within the linkage and permits an angular change to occur between the first and second linkage legs; a free end of the second linkage leg that is coupled to the pulley support yoke so as to form a pulley support yoke pivot point; and a single adjustment element that is coupled to a free end of the first linkage leg and to the conveyor frame at a point away from a pulley support location of the pulley support yoke, such that adjustment of the single adjustment element will produce, through the angular linkage, a pivoting of the pulley support yoke and the supported pulley in a selected direction about the pulley support yoke pivot point.

Such conveyor embodiments may further include a pulley support yoke in the form of a substantially U-shaped open frame having an elongated linkage connecting leg from which two pulley support legs transversely extend. Such conveyor embodiments may further include a pulley support yoke that is adapted to support an idler pulley or a drive pulley of the conveyor. Such conveyor embodiments may further include an angular linkage in the form of a bent but continuous tubular member, in which case the flexure pivot may be formed by one or more voids in the tubular member wall material. Alternatively, such conveyor embodiments may further include an angular linkage in the form of a solid member, in which case the flexure pivot may be formed by an area of thinned linkage material. Such conveyor embodiments may further include a single adjustment element in the form of an adjusting screw in combination with a tension spring, in which case the sensitivity of the belt tracking mechanism may be adjustable by altering the ratio of the length of the second linkage leg to the offset of the pulley support yoke from the pulley support yoke pivot point, and by altering the thread pitch of the adjusting screw.

Other aspects and features of the invention will become apparent to those skilled in the art upon review of the following detailed description of exemplary embodiments along with the accompanying drawing figures.

BRIEF DESCRIPTION OF THE DRAWINGS

In the following descriptions of the drawings and exemplary embodiments, like reference numerals across the several views refer to identical or equivalent features, and:

FIGS. 9A-9C schematically depict tracking adjusted and normal drive pulley positions of an exemplary conveyor using a conveyor belt tracking mechanism according to the invention.

DETAILED DESCRIPTION OF THE EXEMPLARY EMBODIMENTS

Figure 1:
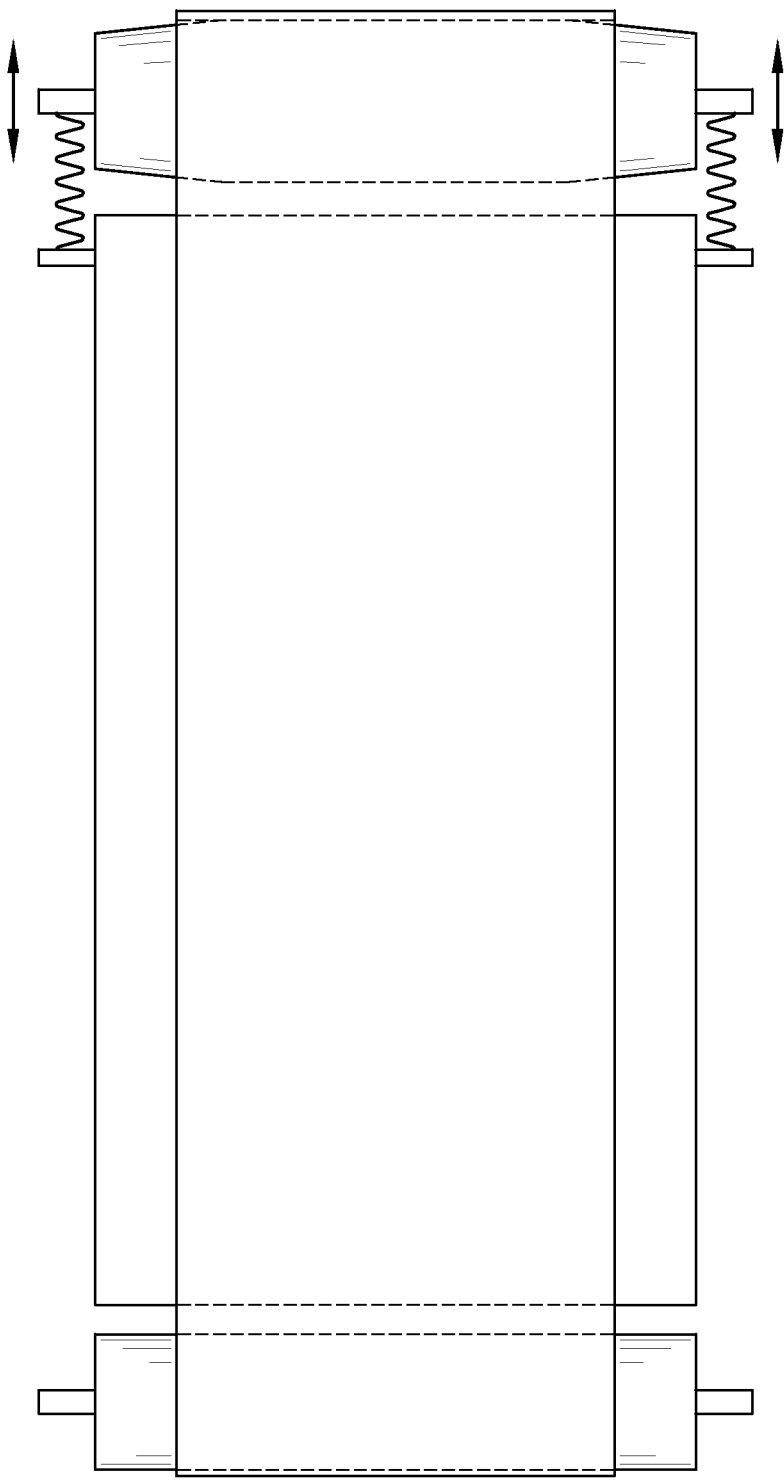
FIG. 1 schematically represents a common embodiment of a known belt conveyor having a typical conveyor belt tracking mechanism.
Figure 2A:
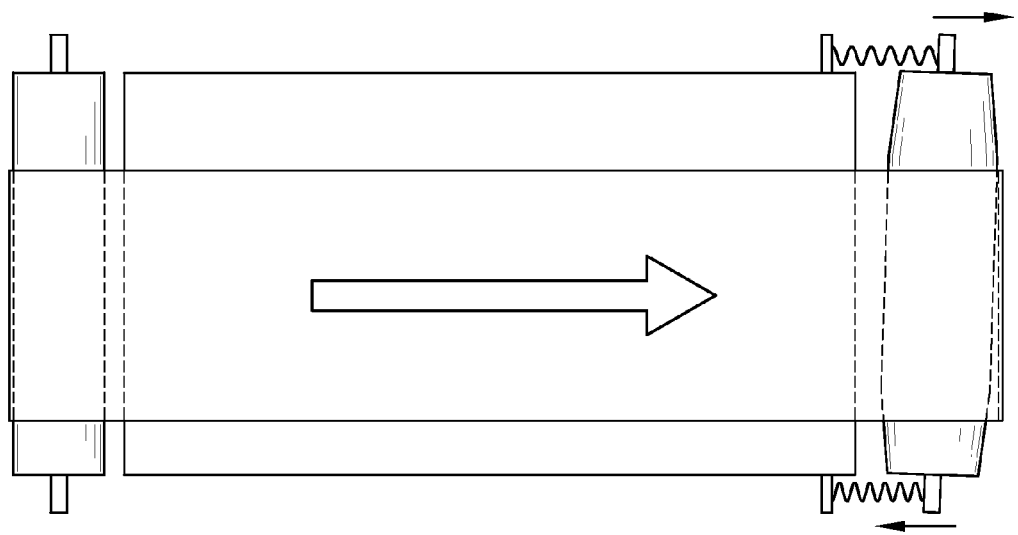
FIGS. 2A and 2B illustrate how adjustments to the position of the drive pulley of the conveyor of FIG. 1 will result in movement of the conveyor belt along the pulley.
Figure 2B:
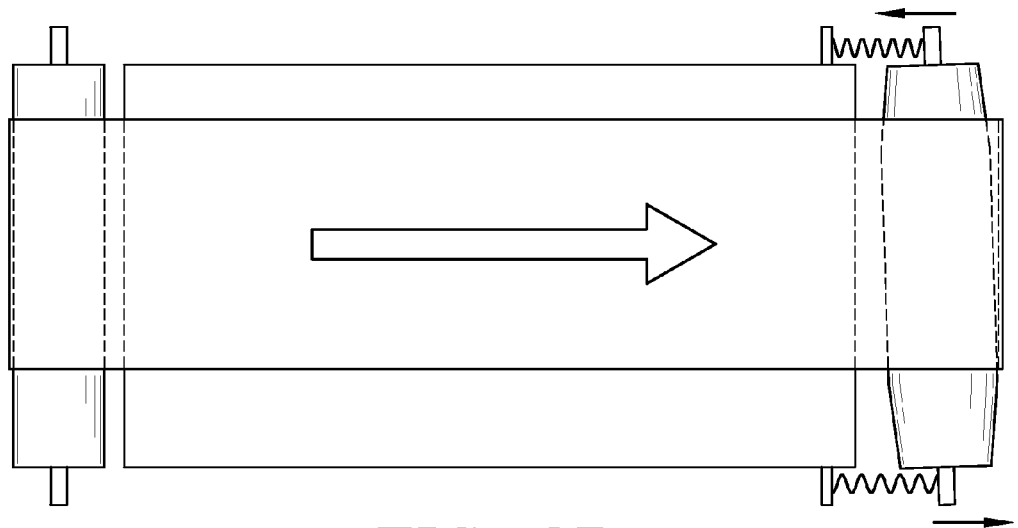
Figure 3:
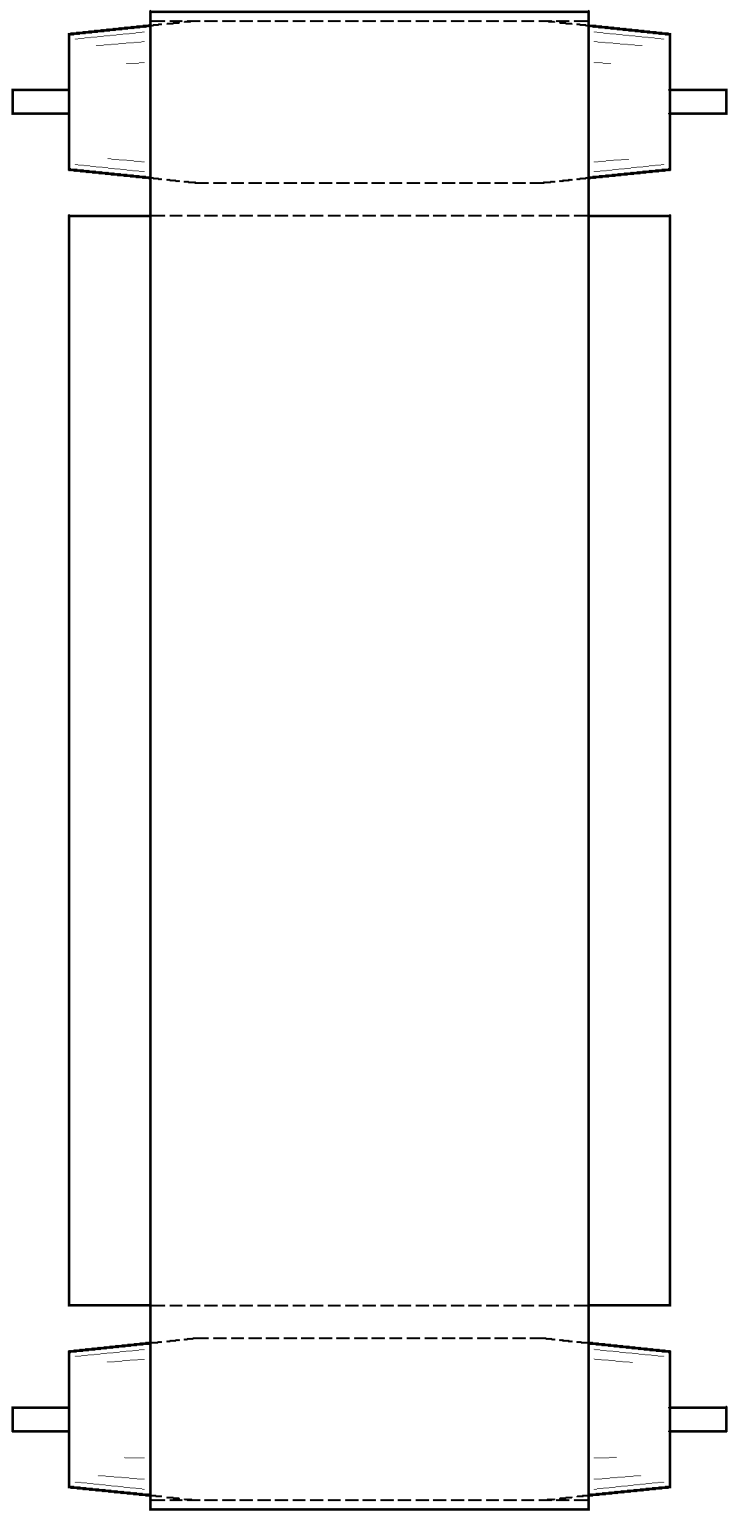
FIG. 3 schematically represents a known alternative embodiment of a belt conveyor that eliminates the conveyor belt tracking mechanism of the conveyor shown in FIG. 1.
Figure 4:
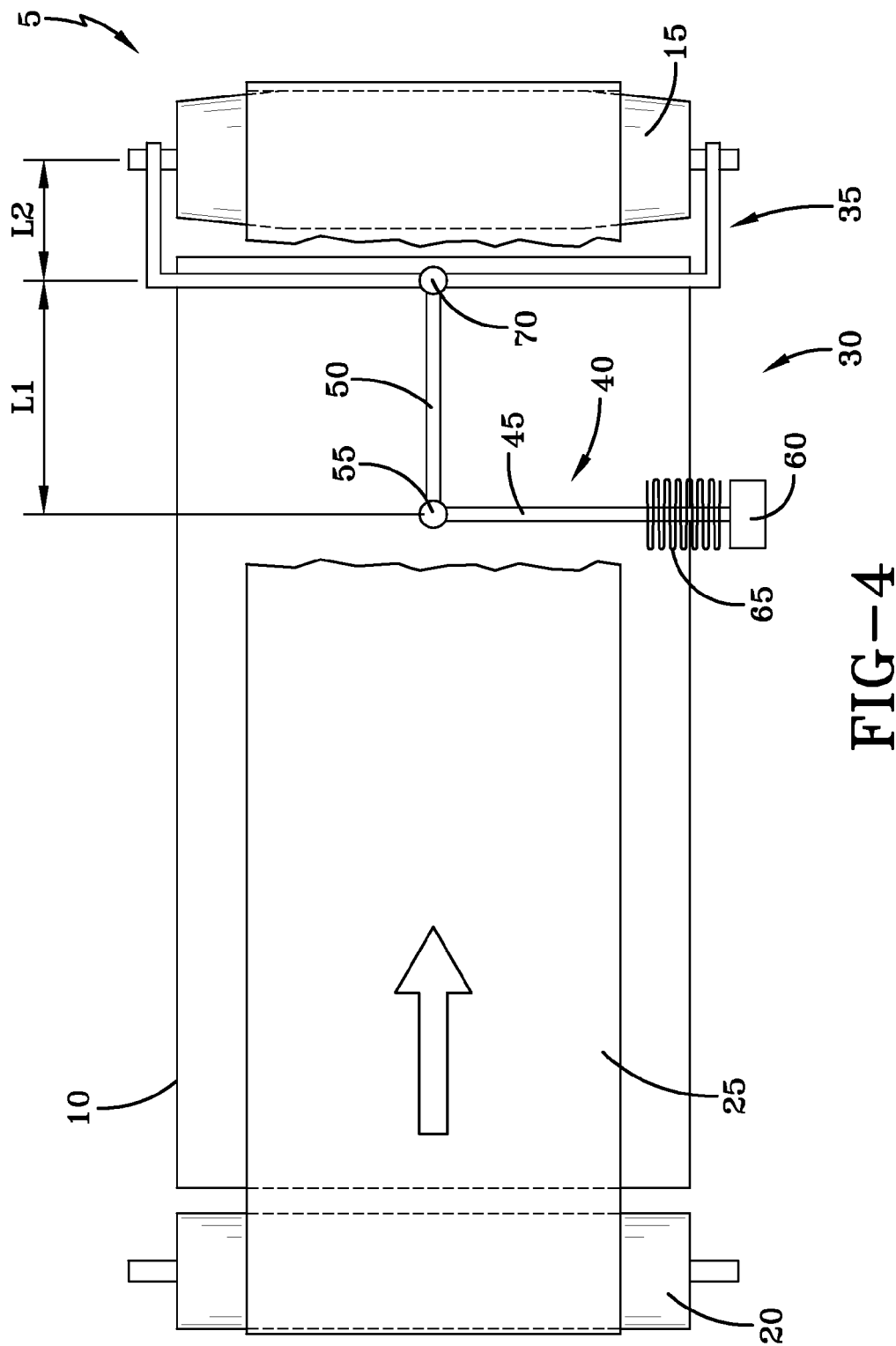
FIG. 4 schematically represents one exemplary embodiment of a conveyor employing a conveyor belt tracking mechanism embodiment according to the invention.
Figure 5:
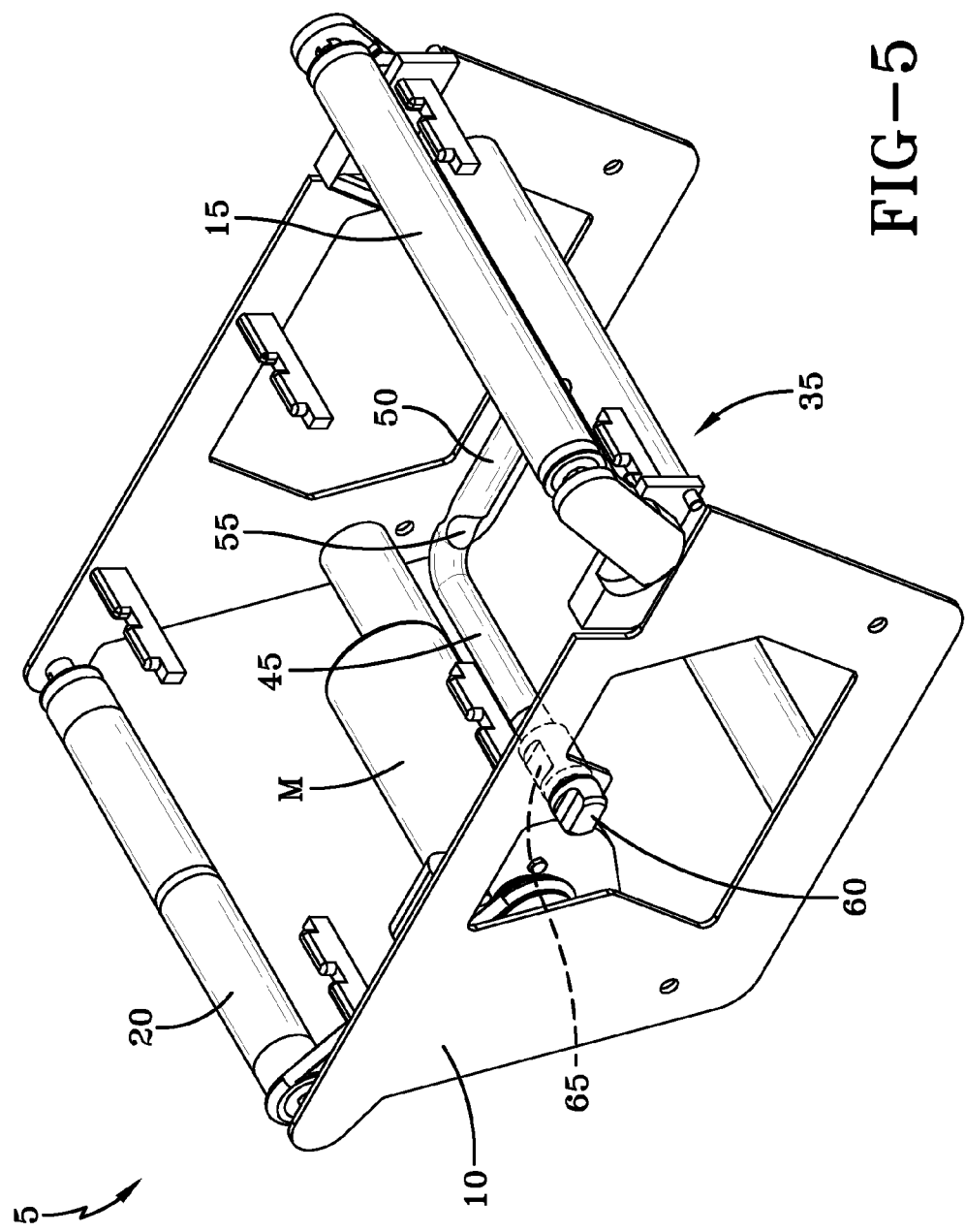
FIG. 5 is a perspective view of an exemplary embodiment of a conveyor employing a conveyor belt tracking mechanism embodiment according to the invention, wherein the conveyor belt has been removed and an idler pulley has been rotated upward for purposes of clarity.
Figure 6:
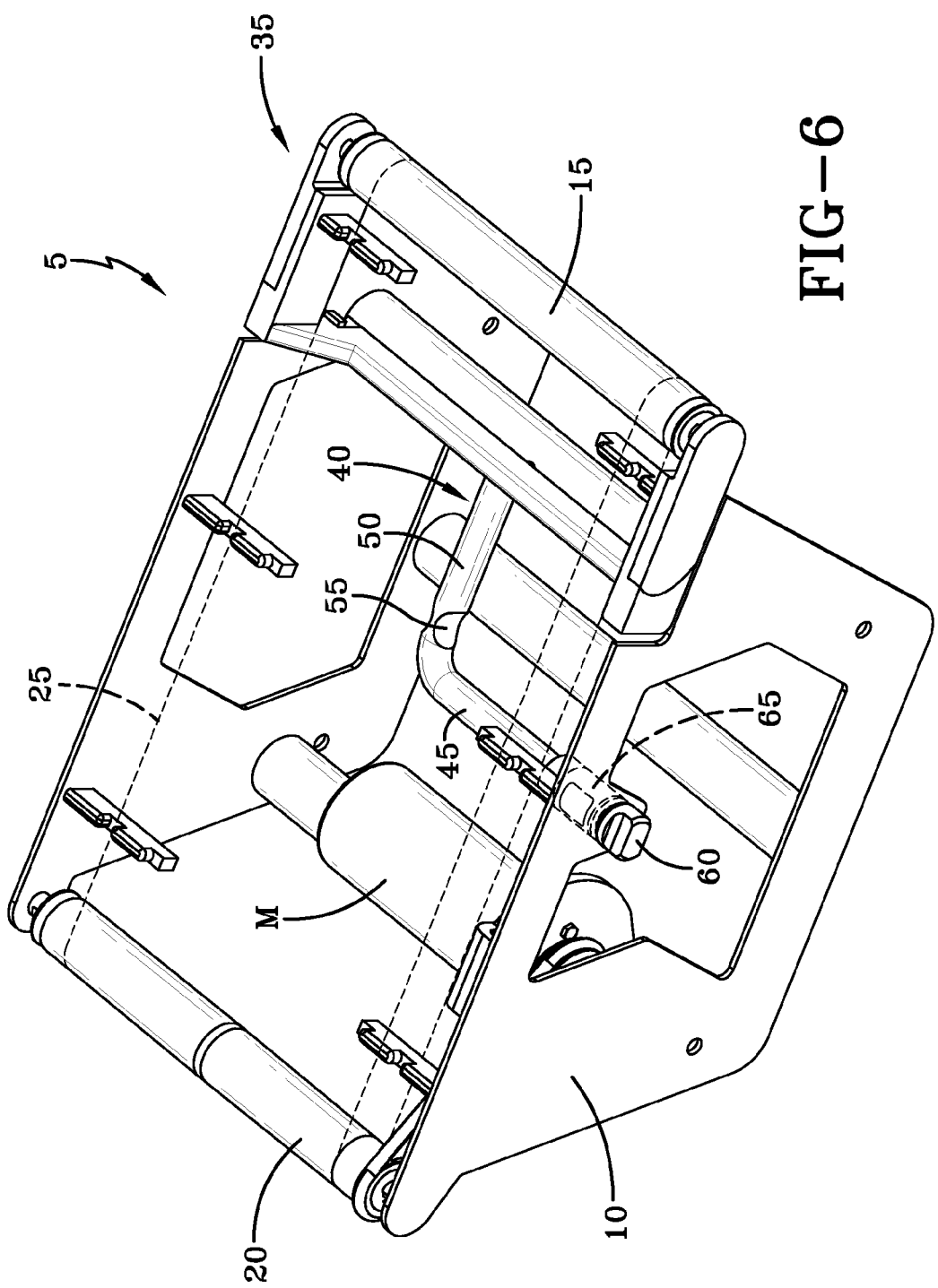
FIG. 6 shows the conveyor of FIG. 5 with the idler pulley in a normal operating position and with an installed conveyor belt that is shown in partial transparency for purposes of clarity.

One exemplary conveyor 5 and conveyor belt tracking mechanism 30 according to the invention is schematically represented in FIG. 4. As shown, the conveyor 5 includes a conveyor frame 10, an idler pulley 15, a drive pulley 20, and an endless loop conveyor belt 25 that travels over the pulleys in the direction of the arrow. At least the pulley with which the belt tracking mechanism is associated is preferably of crowned exterior shape to facilitate belt tracking, although such is not essential to the invention. The conveyor 5 also includes a drive motor M (see FIGS. 5-8) for driving the drive pulley 20 and causing motion of the belt 25, as would be well understood by those of skill in the art.

The conveyor 5 can also be seen to include a novel and inventive conveyor belt tracking mechanism 30. The conveyor belt tracking mechanism 30 includes an idler pulley support yoke 35, and a specialized angular linkage 40 that is interposed between and connects a single adjustment element 60 and the idler pulley support yoke 35. In other embodiments, the belt tracking mechanism may be associated with the drive pulley instead of the idler pulley, although such a construction may be more complicated.

Unlike the case of typical belt conveyors, the single adjustment element 60 preferably resides along a side of the conveyor frame 10 and away from the drive pulley 15. A tensioning spring 65 may be associated with the single adjustment element 60 and used to apply constant pressure to the linkage 40 and to permit the single adjustment element to be displaced without physically moving away from the conveyor frame 10.

Figure 7:
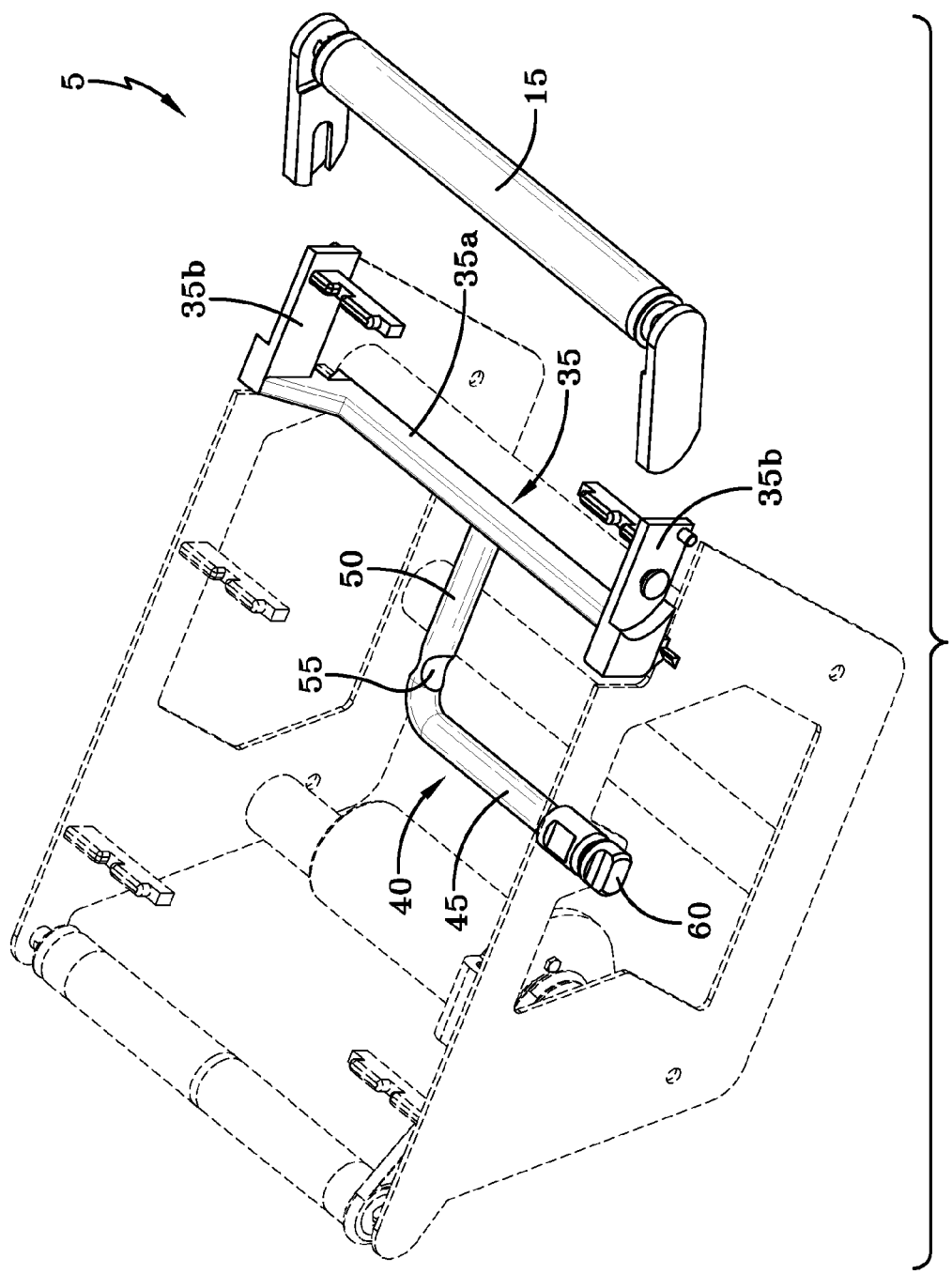
FIG. 7 shows the conveyor of FIG. 5 with the conveyor belt tracking mechanism and idler pulley highlighted for purposes of clarity.
Figure 8:
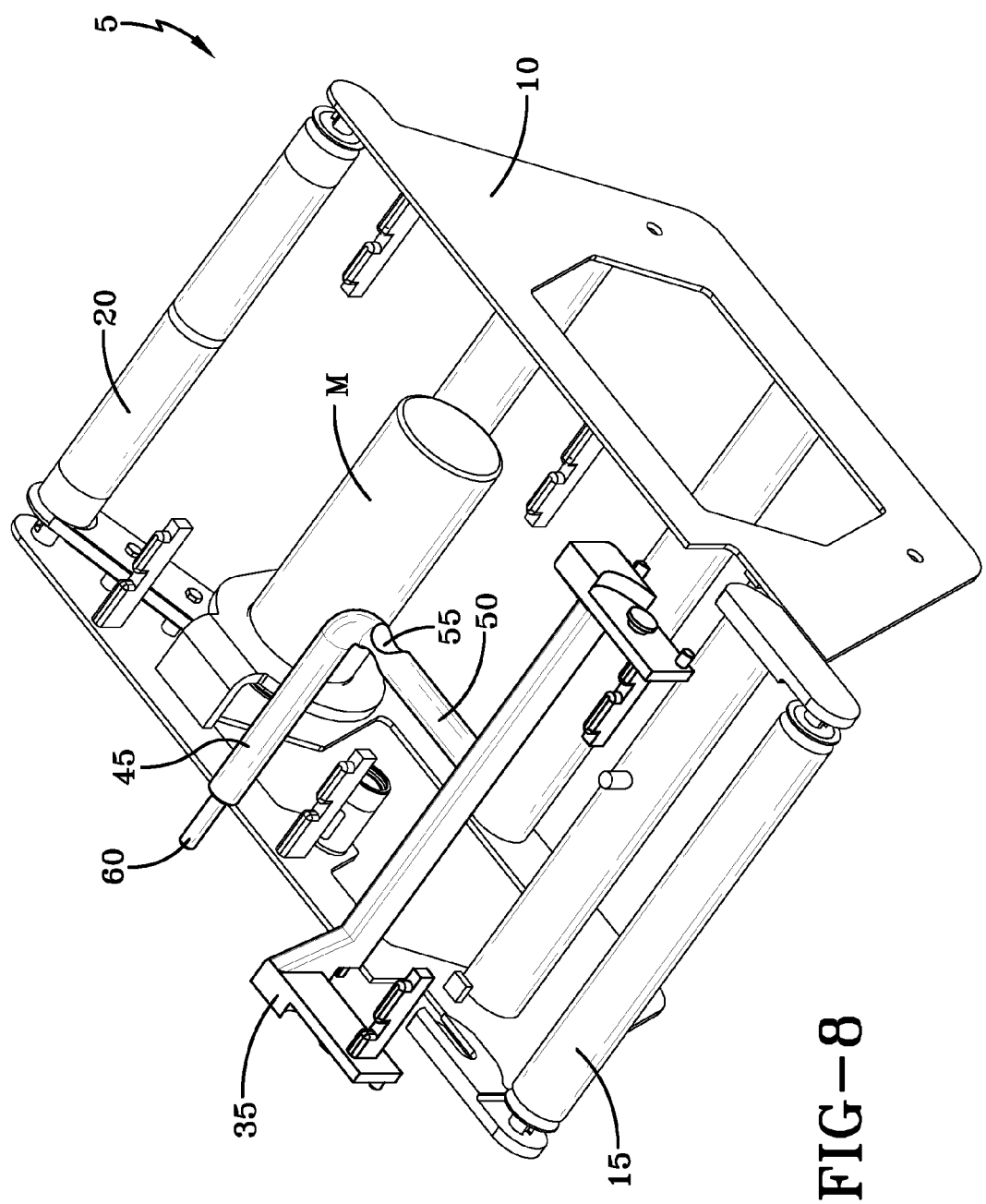
FIG. 8 shows the conveyor of FIG. 5 from an opposite perspective view, and with the conveyor belt tracking mechanism and idler pulley disconnected from the conveyor frame.

This particular embodiment of the idler pulley support yoke 35 is, generally speaking, a substantially U-shaped open frame having an elongated linkage connecting leg 35a from which two pulley support legs 35b transversely extend (see FIG. 7). The yoke 35 is supported within the conveyor frame 10 in a manner that allows some degree of rotation thereof. The connection point of the elongated linkage connecting leg 35a of the yoke 35 and the second leg 50 of the angular linkage forms the yoke pivot point 70. The pulley support legs 35b of the yoke 35 may engage the pulley shaft directly or, as shown herein, may engage other pulley coupling elements. Connection and retention of a pulley to a pulley support yoke may vary from embodiment to embodiment. Furthermore, while the yoke 35 of this exemplary embodiment supports an idler pulley 15, a yoke may instead support a drive pulley in other embodiments.

The angular linkage 40 includes first and second legs 45, 50 between which resides a flexure pivot point 55. The free end of the first linkage leg 45 is connected to the single adjustment element 60 which, in this case, is an adjusting screw or similar threaded fastener. The free end of the second linkage leg 50 is connected to the idler pulley support yoke 35, preferably at about the midpoint thereof. The connecting point of the second linkage leg 50 and the idler pulley support yoke 35 serves as the pivot point 70 of the idler pulley support yoke.

Referring now additionally to FIGS. 5-8, a better understanding of the design and function of the exemplary conveyor belt tracking mechanism 30 is revealed. As shown, this particular example of the angular linkage 40 is comprised of a bent but continuous hollow tubular member, however, other linkage constructions may be employed in other embodiments. In this embodiment of the angular linkage 40, the flexure pivot point 55 is comprised of one or more voids in the tubular member wall that create a weak point within the linkage. Other linkage embodiments may employ different flexure pivot point constructions, as long as the flexure effect thereof is the same. For example, but without limitation, a thinned area of a solid angular linkage may produce a similar result.

In whatever form, the flexure pivot point of the linkage allows for an angular change to occur between the first and second linkage legs 45, 50 when the first linkage leg is linearly displaced by the single adjustment element 60. That is, when a linear displacement of the single adjustment element (e.g., as caused by rotation of an adjustment element in the form of an adjusting screw) causes a like linear displacement of the first linkage leg 45, the second linkage leg 50 will be pushed or pulled at the location of the flexure pivot pint 55 in a direction corresponding to the linear displacement direction of the first linkage leg. This pushing or pulling of the second linkage leg 50 at the flexure pivot point 55 will produce an opposite rotation at the connection point of the second linkage leg and the idler pulley support yoke 35. Consequently, the idler pulley support yoke 35 and the idler pulley 15 will be rotated about the idler pulley support yoke pivot point 70 in a manner that causes a leftward or rightward tracking adjustment of the conveyor belt 25. The direction of tracking adjustment may be selected by operating the single adjustment element in the appropriate manner (e.g., rotating an adjusting screw in the proper direction).

Referring again to FIG. 4, it can be understood that the ratio of the length L1 of the second linkage leg 50 to the distance L2 of the idler pulley axis of rotation (yoke offset) from the yoke pivot point 70 contributes to the sensitivity of the conveyor tracking mechanism. Similarly, when the single adjustment element 60 is a threaded adjusting screw, the thread pitch of the adjusting screw will also contribute to said sensitivity, with a given amount of screw rotation producing a greater or lesser amount of belt tracking movement depending on the thread pitch of the adjusting screw.

FIGS. 9A-9C schematically depict both tracking adjusted and normal idler pulley positions of an exemplary conveyor using a conveyor belt tracking mechanism according to the invention. For example, as shown here, the conveyor associated with the idler pulley 15 and conveyor tracking mechanism 35 of FIGS. 9A-9C is the conveyor 5 of FIGS. 4-8. In FIGS. 9A-9C, FIG. 9B represents a non-tracking adjusted position of the idler pulley support yoke 35 and the idler pulley 15. FIG. 9A represents a tracking adjusted position of the idler pulley support yoke 35 and the idler pulley 15 resulting from displacing the first leg 45 of the angular linage 40 toward the centerline of the conveyor 5 (i.e., to the right with respect to the drawing page). This would result in movement of a conveyor belt away from the extended end of the idler pulley 15 (i.e., to the left with respect to the drawing page). FIG. 9C represents a tracking adjusted position of the idler pulley support yoke 35 and the idler pulley 15 resulting from displacing the first leg 45 of the angular linage 40 toward the frame 10 of the conveyor 5 (i.e., to the left with respect to the drawing page). This would again result in movement of a conveyor belt away from the extended end of the idler pulley 15 (i.e., to the right with respect to the drawing page). In any case, both adjusted positions of the idler pulley 15 shown in FIGS. 9A and 9C are produced by manipulation of the same single adjustment element 60.

While certain embodiments of the invention are described in detail above, the scope of the invention is not considered limited by such disclosure, and modifications are possible without departing from the spirit of the invention as evidenced by the following claims:

What is claimed is:

1. A belt tracking mechanism for use in a belt conveyor, comprising:
   a pulley support yoke adapted for at least limited rotational movement within a frame of the conveyor, the pulley support yoke further adapted to support and retain a conveyor pulley;
   an angular linkage having a first leg and a second leg between which resides a flexure pivot that creates a weak point within the linkage and permits an angular change to occur between the first and second linkage legs, a free end of the second linkage leg coupled to the pulley support yoke; and
   a single adjustment element coupled to a free end of the first linkage leg at a point away from a pulley support location of the pulley support yoke;
   wherein, the single adjustment element is adapted such that adjustment thereof will produce a linear displacement of the first angular linkage leg, said linear displacement causing a pivoting in a selected direction of the second linkage leg and the coupled pulley support yoke.

2. The belt tracking mechanism of claim 1, wherein the pulley support yoke is a substantially U-shaped open frame having an elongated linkage connecting leg from which two pulley support legs transversely extend.

3. The belt tracking mechanism of claim 1, wherein the pulley support yoke is adapted to support an idler pulley of the conveyor.

4. The belt tracking mechanism of claim 1, wherein the pulley support yoke is adapted to support a drive pulley of the conveyor.

5. The belt tracking mechanism of claim 1, wherein the angular linkage is a bent but continuous tubular member.

6. The belt tracking mechanism of claim 5, wherein the flexure pivot is formed by one or more voids in the tubular member wall material.

7. The belt tracking mechanism of claim 1, wherein the angular linkage is a solid member and the flexure pivot is formed by an area of thinned linkage material.

8. The belt tracking mechanism of claim 1, wherein the single adjustment element is an adjusting screw that is also coupled to a frame of the conveyor.

9. The belt tracking mechanism of claim 8, further comprising a tension spring in combination with the adjusting screw.

10. The belt tracking mechanism of claim 1, wherein the sensitivity of the belt tracking mechanism is adjustable by altering the ratio of the length of the second linkage leg to the offset of the pulley support yoke from its connecting point with the second linkage leg.

11. The belt tracking mechanism of claim 1, wherein when the single adjustment element is an adjusting screw, the sensitivity of the belt tracking mechanism is adjustable by altering the thread pitch of the adjusting screw.

12. A belt conveyor having a belt tracking mechanism with a single point of adjustment, comprising:
   a conveyor frame;
   a drive pulley and an idler pulley;
   an endless loop conveyor belt that travels over the pulleys;
   a pulley support yoke mounted with at least limited rotational movement within a frame of the conveyor, the pulley support yoke supporting and rotationally retaining one of the drive pulley or idler pulley;
   an angular linkage having a first leg and a second leg between which resides a flexure pivot that creates a weak point within the linkage and permits an angular change to occur between the first and second linkage legs, a free end of the second linkage leg coupled to the pulley support yoke so as to form a pulley support yoke pivot point; and
   a single adjustment element coupled to a free end of the first linkage leg and to the conveyor frame, at a point away from a pulley support location of the pulley support yoke;
   wherein, the single adjustment element is adapted such that adjustment thereof will produce a linear displacement of the first angular linkage leg, said linear displacement causing, via the second linkage leg, a pivoting of the pulley support yoke and the supported pulley in a selected direction about the pulley support yoke pivot point.

13. The conveyor of claim 12, wherein the pulley support yoke is a substantially U-shaped open frame having an elongated linkage connecting leg from which two pulley support legs transversely extend.

14. The conveyor of claim 12, wherein the angular linkage is a bent but continuous tubular member.

15. The conveyor of claim 14, wherein the flexure pivot is formed by one or more voids in the tubular member wall material.

16. The conveyor of claim 12, wherein the angular linkage is a solid member and the flexure pivot is formed by an area of thinned linkage material.

17. The conveyor of claim 12, wherein the single adjustment element is an adjusting screw in combination with a tension spring.

18. The conveyor of claim 17, wherein the sensitivity of the belt tracking mechanism is adjustable by altering the ratio of the length of the second linkage leg to the offset of the pulley support yoke from the pulley support yoke pivot point, and also by altering the thread pitch of the adjusting screw.

19. A belt conveyor belt tracking mechanism, comprising:
a pulley support yoke adapted for at least limited rotational movement within a frame of the conveyor, the pulley support yoke being a substantially U-shaped open frame having an elongated linkage connecting leg from which two pulley support legs transversely extend to support and retain a conveyor pulley;
an angular linkage in the form of a bent but continuous tubular member, the angular linkage having a first leg and a second leg between which resides a flexure pivot formed by one or more voids in the tubular member wall material that create a weak point within the linkage that permits an angular change to occur between the first and second linkage legs, a free end of the second linkage leg coupled to the pulley support yoke at a pulley support yoke pivot point; and
a single adjustment element in the form of an adjusting screw in combination with a tension spring, the adjusting element adapted for coupling to the conveyor frame and coupled to a free end of the first linkage leg at a point away from a pulley support location of the pulley support yoke;
wherein, the single adjustment element is adapted such that adjustment thereof will produce a linear displacement of the first angular linkage leg, said linear displacement causing, via the second linkage leg, a pivoting of the pulley support yoke in a selected direction about the pulley support yoke pivot point.

20. The belt tracking mechanism of claim 19, wherein the sensitivity of the conveyor tracking mechanism is adjustable by altering the ratio of the length of the second linkage leg to the offset of the pulley support yoke from the pulley support yoke pivot point, and also by altering the thread pitch of the adjusting screw.

* * * * *